United States Patent

[11] 3,583,459

[72] Inventor Moritz Nappe
        Elberon, N.J.
[21] Appl. No. 857,070
[22] Filed Sept. 11, 1969
[45] Patented June 8, 1971
[73] Assignee Dart Industries, Inc.
        West Bend, Wis.

[54] SEALED BAG
    6 Claims, 5 Drawing Figs.
[52] U.S. Cl.................................................. 150/.5,
                                150/2.1, 161/43, 161/44
[51] Int. Cl................................................ B65d 33/00
[50] Field of Search.......................................... 161/43, 44,
                                                45; 150/.5, 2.1

[56]            References Cited
            UNITED STATES PATENTS
2,781,820   2/1957   Rogers ........................ 161/43

3,020,183   2/1962   Calvaresi..................... 161/44X
3,073,367   1/1963   Samara......................... 150/2.1

*Primary Examiner*—Joseph R. Leclair
*Attorneys*—William D. Hall, Elliott I. Pollock, Fred C. Philpitt, George Vande Sande, Charles F. Steininger, Robert R. Priddy and Leigh B. Taylor ABSTRACT: A bag is constructed of interconnected panels each of which comprises a pair of vinyl cover sheets enclosing a fiber glass filler. The outermost edges of the cover sheets are electronically sealed to one another to trap the filler between the cover sheets; and a further electronic seal is provided between the cover sheets inward of the outermost edges thereof and extending through the fiber glass filler to keep the filler from shifting or bunching up.

PATENTED JUN 8 1971 3,583,459
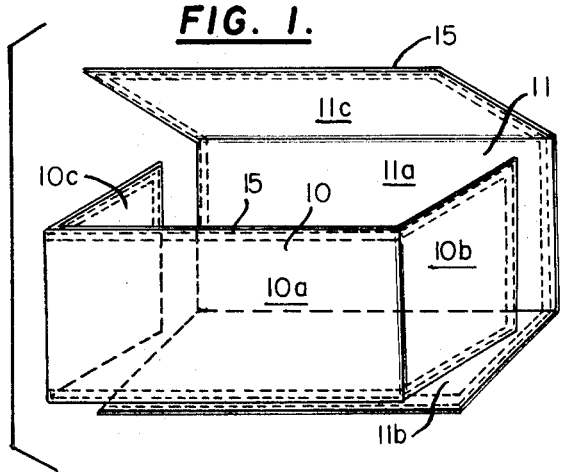
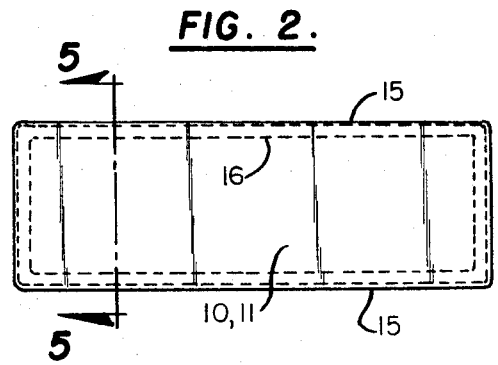
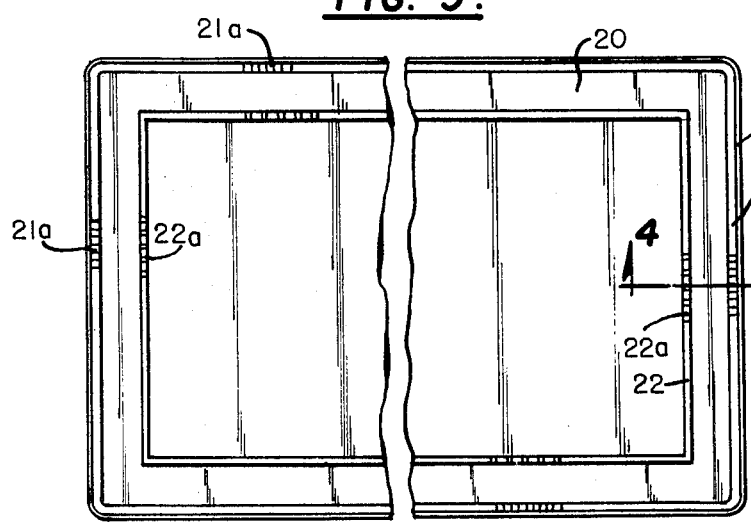
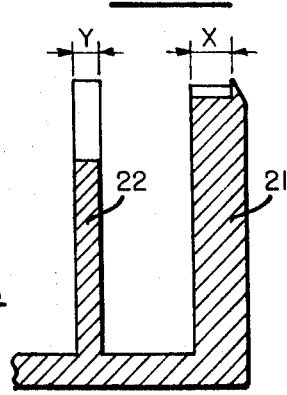
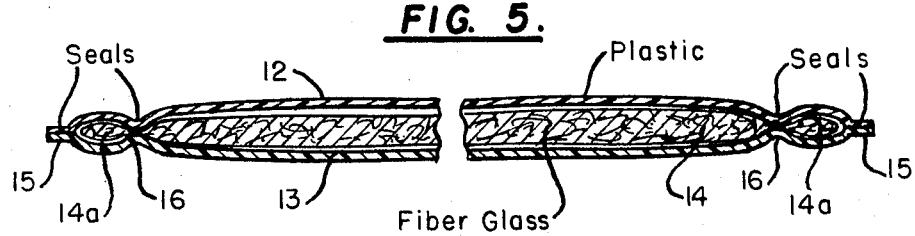
INVENTOR
Moritz Nappe
BY
ATTORNEY

SEALED BAG

BACKGROUND OF THE INVENTION

The general concept of providing an insulating structure for use in the fabrication of bags or the like, and consisting of a pair of plastic sheets enclosing a fibrous filler, is well known. One such structure is, for example, shown in my prior U.S. Pat., No. 2,834,970, issued May 20, 1958, for "Sealed Pad"; and structures of this general type have been used for a variety of purposes heretofore.

When structures of the general type described are used to form portions of an insulated carrier bag, it has been customary to merely trap the fibrous filler within the plastic cover sheets by means of an electronic heat sealed edge extending around the outermost periphery of the cover sheets and in spaced relation to the outer edge of the fibrous filler. This, indeed, is the general arrangement shown in my said prior U.S. Pat., No. 2,834,970. In arrangements of this type, it has been necessary to space the cover layer edge seal from the edges of the fiber glass filler since, in the absence of such spacing, arcing usually occurs during the electronic sealing process with attendant burning or melting of the plastic cover sheets. As a result, when it has been desired to utilize an electronic heat sealing technique in the fabrication of a structure employing a fiber glass filler, the filler has merely been trapped within the plastic cover layer with the filler otherwise being loose and having its edges spaced from the cover edges.

While structures of the types described above, employing a fiber glass filler trapped between peripherally seamed plastic cover sheets, provide excellent insulation, the insulating qualities of the structure, and its general appearance, have been found to deteriorate after a relatively limited period of usage. This deterioration has resulted from the fact that there is no positive juncture between the fiber glass filler and the enclosing plastic cover sheets; and as a result, it has been found that the filler tends to fall, shift in position, and/or bunch up under the influence of gravity and other externally applied forces, so that portions of the region between the cover sheets are no longer filled with fiber glass material. This general problem has also been recognized in the past; and in an effort to avoid this problem, alternative fabrication techniques have been sometimes used.

More particularly, in an effort to avoid shifting or bunching of a fiber glass filler, laminated insulating structures of the general types described have in the past been fabricated by laying a mat of fiber glass material between a pair of cover sheets, folding the edges of at least one cover sheet over the edges of the fiber glass mat, and then sewing the overlapped edges to the main body of the cover sheet directly through the fiber glass filler. This technique actually sews the fiber glass filler into place between the cover sheets and assures that the filler can no longer shift in position relative to the cover sheets. The technique has the disadvantage, however, that it requires a sewing operation which is far more costly and time consuming than a heat sealing technique; and, in addition, the sewing operation perforates the cover sheet whereby the final structure is no longer completely waterproof.

As a result of the considerations described, sealed bags fabricated by techniques prevalent to date have either been subject to the problem of filler shifting and bunching when it has been desired to fabricate such structures by relatively low cost and rapid electronic sealing techniques; or, in the alternative, bags have been fabricated by more time consuming and expensive stitching techniques to avoid possible shifting of the filler while simultaneously sacrificing the completely waterproof quality of the bag. It has been considered impossible, however, to fabricate a bag by an electronic heat sealing technique which achieves a seam or juncture directly between the cover sheets and the fiber glass filler, to avoid shifting or bunching of the filler, simply because any effort to achieve such an electronic seam by prior art techniques has uniformly resulted in arcing and melting of the plastic in the region of the attempted seam.

SUMMARY OF THE INVENTION

The present invention provides a highly improved insulating laminate comprising a pair of thermoplastic cover sheets, such as vinyl, which enclose a fiber glass matted filler material. The filler material is trapped in place between the sheets by means of an electronic seam which is achieved between the outermost peripheries of the two cover sheets. In addition, the fiber glass filler is held in position between the sheets, and prevented from shifting or bunching up, by means of a supplemental electronically heat sealed seam positioned inward of the peripheral seam and extending between the outer cover sheets directly through the fiber glass filler. In essence, therefore, the present invention makes use of highly desirable, labor-saving electronic heat sealing techniques in fabricating the laminate; and uses such techniques to produce, inter alia, a vinyl to vinyl seam which extends directly through an intervening fiber glass layer so as to prevent the fiber glass material from shifting in position relative to the outer plastic cover layers of the laminate.

In order to permit fabrication of the improved laminate described above, without suffering the problem of arcing and plastic melting which has characterized prior art techniques along the same line, the present invention makes use of a special die having two spaced serrated edges operative to form the outer peripheral and inner supplementary seams respectively. Two such dies are placed in opposing relation to one another in an electronic press of generally conventional design, having hydraulically operated cylinders which are used to move the dies toward and away from the material to be sealed; and the press is modified to incorporate booster cylinders so as to increase the pressing force of the dies on the material to be sealed. The corrugated or serrated edges of the dies are thus capable of pressing the upper and lower plastic layers forcibly toward one another into very close proximity to one another. In that region of the die where the die overlies fiber glass material, this forcible pressing of the plastic cover materials toward one another simultaneously presses the fiber glass layer to one side, or compresses the fiber glass layer, so that the upper and lower plastic layers can seal to one another notwithstanding the fact that fiber glass was interposed between them before the pressure was applied. An initial time period is provided to permit solid bedding of the die, and compression of vinyl to vinyl, prior to actual application of RF to the die; and once RF is applied after this initial time delay period, a relatively low level of power is applied for a relatively long time interval to decrease the possibility of arcing.

By these techniques, a completely new structure is fabricated wherein a vinyl to vinyl seam is achieved directly through an intervening fiber glass insulating layer so as to keep the layer from shifting in position or bunching up, while simultaneously preserving the integrity of the cover material and the waterproof character of the final laminate.

BRIEF DESCRIPTION OF THE DRAWINGS

FIG. 1 is an illustrative exploded diagram of a sealed bag constructed in accordance with the present invention;

FIG. 2 is an illustrative diagram of a typical panel employed in the fabrication of the bag of FIG. 1;

FIG. 3 illustrates a die of the type employed to fabricate the panel of FIG. 2;

FIG. 4 is a cross section of the die of FIG. 3 taken on line 4—4; and

FIG. 5 is a cross section of the improved laminate formed in accordance with the present invention, and taken on line 5—5 of FIG. 2.

DESCRIPTION OF THE PREFERRED EMBODIMENT

A sealed bag constructed in accordance with the present invention comprises a pair of insulating laminated panels 10 and 11 each of which is initially of elongated rectangular configuration, as shown in FIG. 2. Each such panel (see FIGS. 2 and 5) comprises a pair of generally parallel spaced air and watertight thermoplastic sheets 12 and 13, such as vinyl, which completely enclose a unitary, matted fiber glass filler 14. The fiber glass mat 14 is trapped between sheets 12 and 13 by means of a peripheral electronically formed seal 15 disposed outwardly of and spaced from the edges of mat 14; and said mat 14 is held in position between said sheets by means of a further electronically formed seal 16 disposed inwardly of and generally parallel to peripheral seal 15, and extending between the vinyl layers 12 and 13 directly through the intervening fiber glass material 14. By this arrangement, a relatively narrow elongated peripheral edge portion 14a of the fiber glass filler 14 is firmly trapped between spaced seals 15 and 16, around all four edges of each rectangular panel 10 and 11, whereby the filler 14 is rendered incapable of shifting in any direction relative to any edge of panel 10 or 11.

The two panels 10 and 11 are separately fabricated and have different dimensions as will be apparent from examination of FIG. 1. Once these two panels have been fabricated, panel 10 is folded into a generally U-shaped configuration comprising rear section 11a, bottom section 11b, and top section 11c. The two U-shaped structures are then attached to one another by any appropriate technique, e.g., electronic sealing, with the free vertical edges of end sections 10b and 10c being attached to the outer vertical edges of rear section 11a, and with the bottom edges of sections 10a, 10b and 10c being attached to the corresponding outer edges of section 11b. This forms an enclosed bag with section 11c acting as a hinged cover for said bag, and an appropriate zipper may be attached around the edges of panel 11c and around the corresponding upper edges of sections 10a, 10b and 10c to permit the bag to be closed and opened as desired.

It should be noted that panels 10 and 11 can, if desired, be attached to one another, and a zipper can also be installed in the manner described, by means of a sewing technique. This achieves a very strong juncture between the panels, and between the panels and zipper. All such sewing, however, should be confined to the region between seals 15 and 16 of each panel 10 and 11; and therefore even though a sewing technique may be employed, the waterproof character of the entire structure is in no way affected since the inner seam 16 extending around all edges of each panel 10 and 11 isolates the main portions of the bag from needle perforations in the sewn edges.

In order to form the double seam 15, 16, and particularly the seam 16 which extends directly through fiber glass filler 14, a novel die of the type shown in FIGS. 3 and 4 is employed. Die 20 is of generally rectangular configuration and is provided with an upstanding peripheral rim 21 extending around all four sides of the die. Rim 21 is employed to form the outer peripheral seal 15, and has a serrated or corrugated edge as illustrated at 21a in FIG. 3. Each tooth of the corrugated edge is spaced from the adjacent teeth by approximately one-thirtysecond inch; and each tooth forms a seal which is dimensioned substantially one-sixteenth inch by three thirty-seconds inch. The three thirty-seconds inch dimension is illustrated in FIG. 4 by the dimension X, and the one-sixteenth inch dimension is transverse thereto.

Die 20 is further provided with an upstanding flange 22 which is of the same height as rim 21 and which is spaced inwardly thereof. Flange 22 exhibits a closed rectangular configuration as shown in FIG. 3 and is used to produce inner seam 16 during the electronic heat sealing operation. The uppermost edge of flange 22 is also serrated, as at 22a, to provide a plurality of teeth which form rectangular spotlike seals each dimensioned one-sixteenth inch by three thirty-seconds inch. The one-sixteenth inch dimension for each of the seal spots formed along seam 16 is illustrated by the dimension Y in FIG. 4, and the three thirty-seconds inch dimension of each such seal spot extends transverse thereto. Each tooth of the serrated flange 22 is spaced from the adjacent teeth by substantially one-sixteenth inch.

A die of the type shown in FIG. 3 is mounted in high frequency sealing and heating equipment, e.g., of the type marketed under the designation Thermatron type K151S by Willcox and Gibbs. This commercially available equipment is, however, modified to add booster cylinders operative to increase the force with which an opposing pair of dies such as 20 press into the opposing plastic sheets 12 and 13 during fabrication of the laminate. The serrated edges 21a and 22a along die rim 21 and die flange 22 serve two functions, i.e., they tend to concentrate the applied pressure to relatively small areas of the plastic material to be sealed, and, in addition, direct applied RF to the immediate area of such pressure. The corrugations along the edges of the dies thus press the upper and lower plastic layers 12 and 13 forcibly toward one another into very close proximity, and simultaneously press the fiber glass material 14 to one side between the teeth of serrated portion 22a, and forcibly compress any remaining fiber glass material which may underlie any tooth in serrated section 22a, so that essentially vinyl to vinyl contact is achieved along flange 22 to permit the upper and lower plastic layers to seal to one another notwithstanding the fact that fiber glass was interposed between the two layers in this region before the pressure was applied.

In operation, hydraulic pressure is first applied to the dies for an initial time period, e.g., three seconds, prior to application of RF. This assures that the die is very solidly bedded, to achieve fiber glass compression and vinyl to vinyl contact before the die is actually energized. If this solid bedding is not achieved prior to energization of the die, arcing may occur with resultant melting or burning of the plastic layer underlying flange 22. After the initial three-second time lapse, the die is energized by application of RF thereto. Sealing is accomplished, of course, as a function of both the power which is applied and the time of its application. The shorter the time cycle, the more power required. Since relatively high power increases the incidence of arcing, particularly if there is an inert material such as fiber glass between the plastic layers, power is applied for a relatively long period (e.g., a 5-second fusion cycle) and at a relatively low power level.

By attention to all of the factors described, i.e., the serrated die, the increased pressure between the die and laminate, the initial time delay to permit solid bedding, and the relatively long and low power fusion cycle, it becomes possible for the first time to form a seam such as 16 which extends directly through an intervening fiber glass layer without burning or melting the outer vinyl layers. It thus becomes possible to fabricate a sealed bag which has superior characteristics of insulation and waterproofness, and which exhibits these characteristics over a longer period of time in usage; and, in addition, to fabricate such structures by a more rapid, labor saving, and less expensive technique than has been considered possible heretofore.

I claim:

1. A carrier bag structure having a flexible insulating wall panel comprising a unitary, generally flat surfaced mat of fiber glass material, said panel including a cover of air and watertight flexible thermoplastic sheet material completely surrounding and enclosing said fiber glass mat, said cover including a pair of cover sections spaced from one another adjacent the opposing flat surfaces of said mat and having peripheral edges which overlie one another and are electronically sealed to one another along peripheral seams spaced outwardly of and free from the peripheral edges of said mat, each of said cover sections including regions which are depressed toward one another through said fiber glass material to define supplemental seam regions extending along lines positioned inward of the peripheral edges of both said cover sections and of said mat, said supplemental seam regions being electronically sealed to one another through said fiber glass material to trap a portion of said mat between said supplemental seam regions and the electronically sealed peripheral seams of said cover sections, whereby said mat is sealed within said thermoplastic cover sections by means of said electronic peripheral seams and is prevented from shifting in position or bunching up between said cover sections by means of said electronically sealed supplemental seam regions.

2. The structure of claim 1 wherein said supplemental seam regions comprise a plurality of separate seal spots spaced from one another along lines extending generally parallel to the peripheral edges of said cover sections.

3. The structure of claim 1 wherein said mat and said cover sections are each rectangularly shaped, said supplemental seam regions extending in a rectangular configuration along lines parallel to all four edges of said cover sheets and mat at positions relatively closely adjacent to the peripheral edges of said cover sections to trap in place a relatively narrow peripheral band of said mat adjacent all four edges of said mat, the remaining main portion of said mat inward of said supplemental seam regions being free of attachment from said cover sheets.

4. The structure of claim 3 wherein said peripheral seams extend along all four edges of said cover sections.

5. The carrier bag structure of claim 1 wherein a plurality of said insulating walls panels are interconnected to one another by sewn seams, said sewn seams being confined to positions located between the peripheral seams and supplemental seams regions of each such panel.

6. The structure of claim 1 wherein said thermoplastic sheet material is vinyl.